US008694166B2

(12) United States Patent
Quirk

(10) Patent No.: US 8,694,166 B2
(45) Date of Patent: Apr. 8, 2014

(54) DYNAMIC HVAC AIRSIDE ECONOMIZER HIGH LIMIT START CONTROL

(75) Inventor: David Vincent Quirk, Easton, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 482 days.

(21) Appl. No.: 13/151,826

(22) Filed: Jun. 2, 2011

(65) Prior Publication Data

US 2012/0310420 A1 Dec. 6, 2012

(51) Int. Cl.
*G06F 19/00* (2011.01)

(52) U.S. Cl.
USPC .......................... 700/278; 700/276

(58) Field of Classification Search
USPC .................................. 700/276, 278
See application file for complete search history.

(56) References Cited

U.S. PATENT DOCUMENTS

| 5,395,042 | A | * | 3/1995 | Riley et al. ................. 236/46 R |
| 6,078,853 | A | * | 6/2000 | Ebner et al. ..................... 701/36 |
| 6,978,632 | B2 | * | 12/2005 | Suzuki et al. ................ 62/228.5 |
| 7,099,784 | B2 | * | 8/2006 | Spitaels et al. .................. 702/57 |
| 7,865,272 | B2 | * | 1/2011 | Spitaels et al. ................ 700/299 |
| 8,575,907 | B2 | * | 11/2013 | Pan ............................... 323/276 |

* cited by examiner

*Primary Examiner* — Kidest Bahta

(57) ABSTRACT

A device stores control settings for an air conditioning unit for a space that houses power-consuming equipment. The air conditioning unit includes an economizer configured to supply outside cooling air when the economizer is in an active state. The device receives an inside temperature value associated with the space, and receives a real-time or near-real-time operating load value for the power-consuming equipment. The device determines, based on the inside temperature value, the operating load value, and the control settings, an outside temperature threshold for starting the economizer. The device determines if an outside temperature reading associated with the space is below the outside temperature threshold, and activates the economizer when the outside air temperature reading is below the outside temperature threshold.

20 Claims, 6 Drawing Sheets

FIG. 5

| DC LOAD (510) | Qs (520) | Vcfm (530) | Tin (540) | Tid (550) |
|---|---|---|---|---|
| DC Load (amps @ 27vdc) | Required Economizer Cooling Capacity (Btu/hr) | CFM @ 0.2ESP and dry coil on typical 5-ton HVAC unit | Indoor Temp Setting | Required Outside Temperature for Airside Economizer Operation |
| 100 | 10,640 | 2000 | 77 | 72 |
| 150 | 15,960 | 2000 | 77 | 70 |
| 200 | 21,281 | 2000 | 77 | 67 |
| 250 | 26,601 | 2000 | 77 | 65 |
| 300 | 31,921 | 2000 | 77 | 62 |
| 350 | 37,241 | 2000 | 77 | 60 |
| 400 | 42,561 | 2000 | 77 | 58 |
| 450 | 47,881 | 2000 | 77 | 55 |
| 500 | 53,202 | 2000 | 77 | 53 |
| 550 | 58,522 | 2000 | 77 | 50 |
| 600 | 63,842 | 2000 | 77 | 48 |

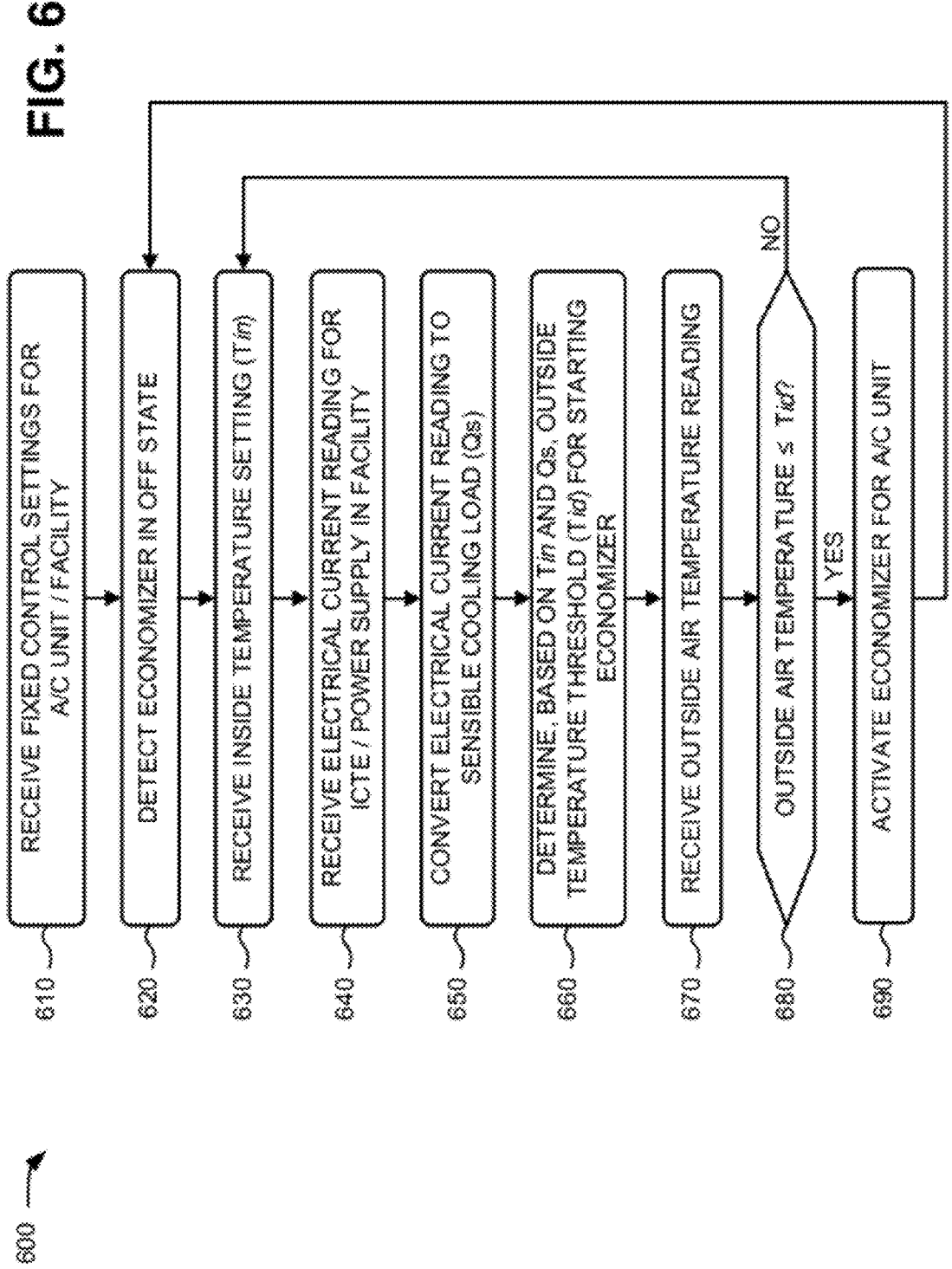

DYNAMIC HVAC AIRSIDE ECONOMIZER HIGH LIMIT START CONTROL

BACKGROUND

Heating, ventilating, and air conditioning (HVAC) systems may use airside economizers to reduce or eliminate the need for mechanical cooling when relatively cooler outside air temperatures exist. Airside economizers may selectively draw in cooler air when outside air conditions are favorable and limit outside air intake when conditions are not favorable for cooling. As outside temperatures drop from unfavorable to favorable (e.g., higher to lower), controls used to start economizer mode operations are traditionally based on a fixed temperature threshold.

BRIEF DESCRIPTION OF THE DRAWINGS

FIG. 5 shows a portion of a data structure that is capable of being generated/used by the HVAC controller of FIG. 2; and FIG. 6 is a flowchart of an exemplary process for dynamically adjusting airside economizer high start limits, according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may dynamically determine HVAC airside economizer high start limits for data center environments. The systems and/or methods may control a transition from mechanical cooling to economizer mode using dynamic feedback of load information to intelligently make a decision to start economizer operation as outside air temperatures are dropping.

Figure 1:
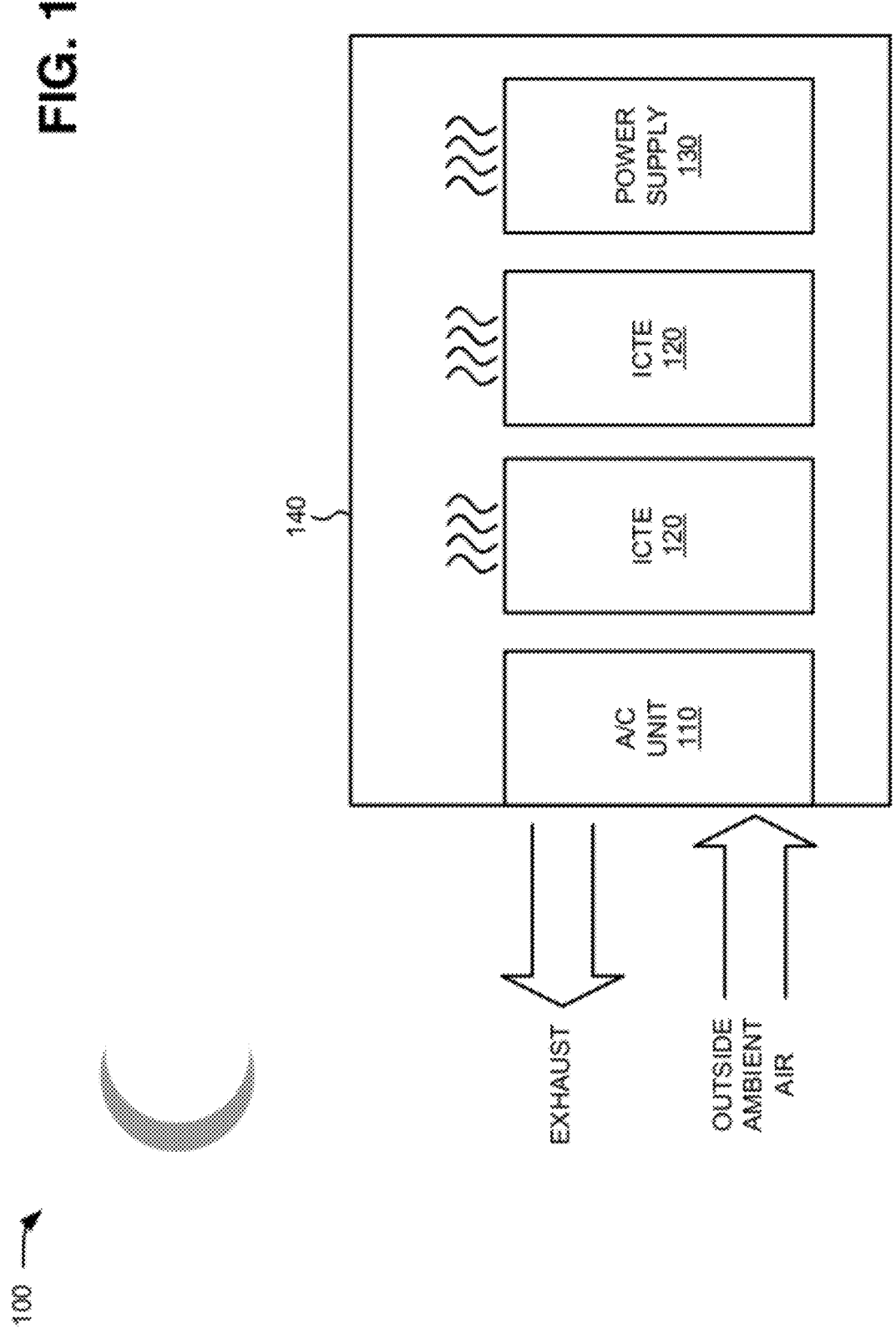
FIG. 1 is a diagram that illustrates an exemplary environment in which systems and/or methods, described herein, may be implemented.

FIG. 1 is a diagram that illustrates an exemplary environment 100 in which systems and/or methods described herein may be implemented. As shown in FIG. 1, environment 100 may include an air conditioning (A/C) unit 110, information and communication technology equipment (ICTE) 120, a power supply 130, and a facility 140. These components are illustrated in FIG. 1 for simplicity. In practice, there may be more HVAC units 110, ICTE 120, power supplies 130, and/or facilities 140.

A/C unit 110 may include a mechanical air cooling system with an airside economizer. A/C unit 110 may employ the airside economizer to cool hotter internal air of facility 140 by drawing in cooler outside air. Cooler outside air is brought into facility 140 through A/C unit 110, while hotter air is exhausted to the outside. The economizer mode of operation prevents the need to run HVAC refrigerant compressors (e.g., within A/C unit 110) that consume more energy than fans used to exchange the outside air with the inside air. In one implementation, multiple HVAC units 110 may be arranged in a redundant (e.g., master/backup) configuration. A/C unit 110 is described further in connection with, for example, FIG. 2.

ICTE 120 may include network devices, server devices, and/or other types of computation or communication devices, that gather, process, search, transfer, and/or provide information to support communications networks. In one implementation, ICTE 120 may include any networking devices, computing devices, data storage devices, and/or other power-consuming devices that typically generate heat loads due to internal heat gain.

Power supply 130 may include an uninterruptible power supply (UPS) plant or another type of power plant. In one implementation, power supply 130 may include a datacenter-scale system designed to power ICTE 120 within facility 140. For example, power supply 130 may include an on-line UPS to accept alternating current (AC) input, rectify the AC input to direct current (DC) for passing through a rechargeable battery, then invert back to AC (e.g., 120 V/230 V) for powering ICTE 120. Power supply 130 may typically include heat losses associated with power conversion (AC or DC voltages) and/or supply of power to ICTE 120.

Facility 140 may include a building or space (e.g., cooled by A/C unit 110) to house ICTE 120 and power supply 130. Facility 140 may include, for example, a data center facility, a telecommunications facility, or a cellular site where internal loads from known equipment (e.g., ICTE 120, power supply 130, etc.) represent a majority of a total sensible cooling load (e.g., calculated in Btu/hr) of facility 140. For example, systems and/or methods described herein may be applicable to facilities 140 where ICTE 120/power supply 130 represent approximately 75 percent or more of the total sensible cooling load (of the facility and/or space being cooled) based on engineering HVAC load calculations performed in accordance with accepted industry practice. In some implementations, ICTE 120/power supply 130 may represent more than 90 percent of the total sensible cooling load.

Traditional methods of control of airside economizers use a form of "high-limit" shut-off temperature control, whereby the refrigerant compressors (e.g., in A/C unit 110) are engaged when return air temperatures and/or enthalpy rise above a preset value and/or a value compared to outside temperatures, commonly referred to as "fixed dry-bulb," "differential dry-bulb," "fixed enthalpy," "differential enthalpy," and combinations of these, respectively. These solutions are used to control A/C unit 110's transition from economizer mode back to mechanical cooling as the outside temperatures rise. The control traditionally used to start economizer operation is based on a fixed temperature setting, typically using the same supply temperature setting used during mechanical cooling mode of operation in the case of non-integrated mode of economizer operation. When integrated mode of economizer operation is used, a slightly higher outside ambient temperature/enthalpy setting is used to start the economizer, and a combination of mechanical cooling and outside air are used until the outside ambient temperature reaches the normal mechanical cooling supply temperature. However, these traditional start controls are not the most efficient method of economizer control operation because these controls assume that the load internally (e.g., inside facility 140) is always at a peak condition, which is rarely the case.

In implementations described herein, control logic may apply cooling loads from ICTE 120 and/or power supply 130, the inside temperature of facility 140, and the ventilation rate (e.g., in cubic feet per minute (cfm)) of airflow from the installed HVAC equipment to dynamically determine the outside air temperature at which economizer mode may be started to satisfy the internal cooling loads. Thus, systems and/or methods described herein may capture additional hours of economizer cooling for A/C unit 110.

Although FIG. 1 shows an exemplary environment 100, in other implementations, environment 100 may include fewer components, different components, differently arranged components, or additional components than those depicted in FIG. 1.

Figure 2:
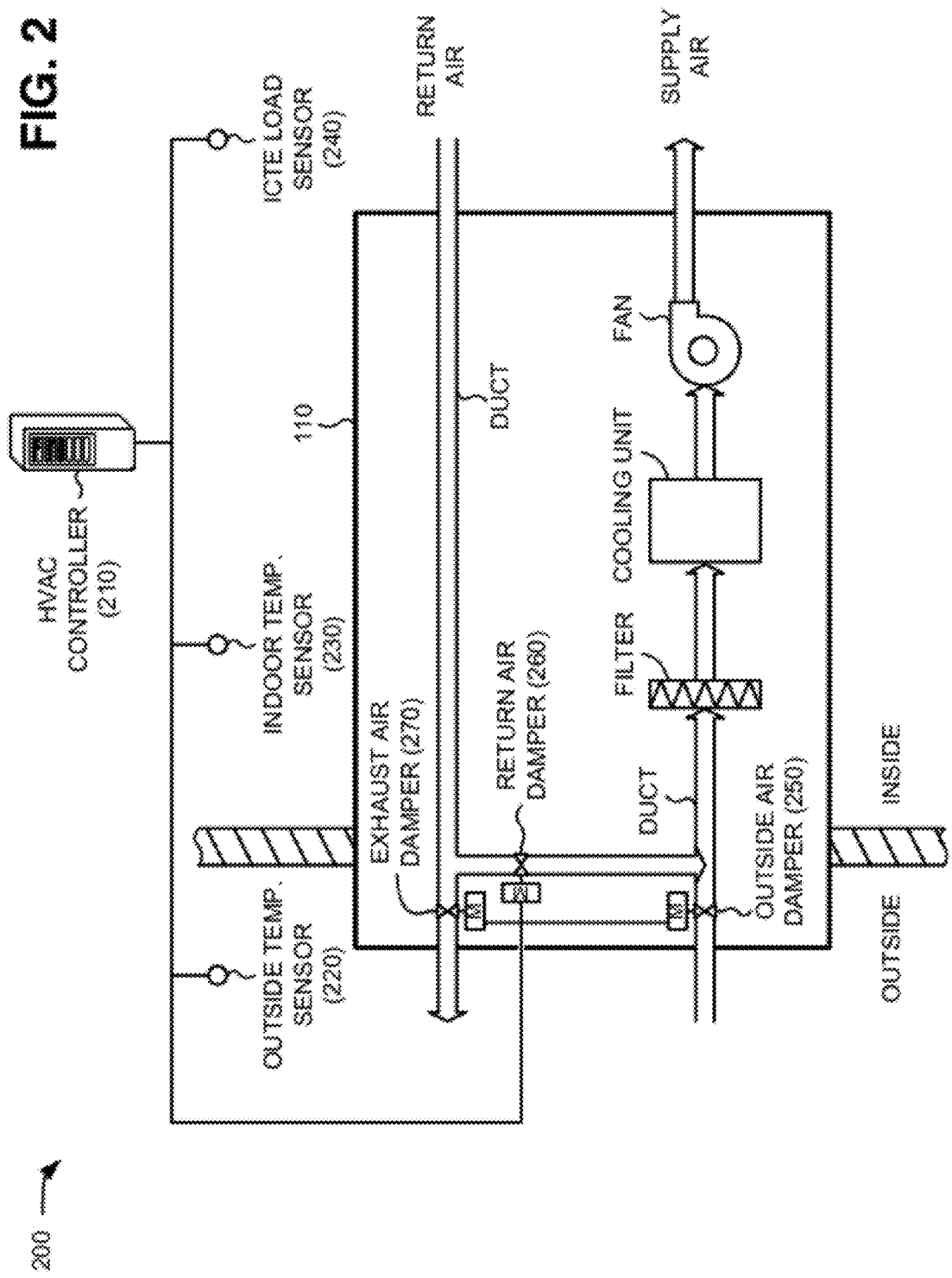
FIG. 2 is a diagram of exemplary components of a control network that may be used within the environment of FIG. 1.

FIG. 2 is a diagram that illustrates an exemplary control network 200 for A/C unit 110. As shown in FIG. 2, control network 200 may include A/C unit 110, an HVAC controller 210, an outside temperature sensor 220, an indoor temperature sensor 230, and ICTE load sensor 240. These components are illustrated in FIG. 2 for simplicity. In practice, there may be more HVAC units 110, HVAC controllers 210, outside temperature sensors 220, indoor temperature sensors 230, and/or ICTE load sensors 240. Components of control network 200 may be connected via wired or wireless connections. Also, in some instances, a component of control network 200 may perform one or more functions described as being performed by another component or group of components of control network 200.

A/C unit 110 may include one or more filter, A/C unit, fan, and/or ducts to provide mechanical air cooling to facility 140. A/C unit 110 may also include an outside air damper 250, a return air damper 260, and an exhaust air damper 270 that may be selectively adjusted (e.g., as determined by HVAC controller 210) to switch between an airside economizer mode and a mechanical cooling mode. For example, outside air damper 250, return air damper 260, and exhaust air damper 270 may be mechanically opened/closed based on signals from a controller (e.g., HVAC controller 210) in a building automation system.

HVAC controller 210 may include one or more computing devices, or other types of computation or communication devices, that gather, process, search, and/or provide information in a manner described herein. For example, HVAC controller 210 may include a programmable logic controller (PLC), a server, a personal computer, or another component within a building automation system. In one implementation, HVAC controller 210 may receive outside temperature information (e.g., from outside temperature sensor 220), indoor temperature information (e.g., from indoor temperature sensor 230), and electrical current readings (e.g., from ICTE load sensor 240). Based on the received information, HVAC controller 210 may apply a control algorithm to determine a start outside temperature threshold (e.g., a highest possible outside air temperature) at which the economizer mode may be invoked for A/C unit 110 given the current cooling load. As described further herein, HVAC controller 210 may estimate cooling loads based on measured output levels (e.g., electric current readings or other load indicators) of power supply 130.

HVAC controller 210 may detect when the actual outside air temperature reaches (e.g., drops to) the start temperature threshold and initiate the economizer mode. For example, in one implementation, HVAC controller 210 may open outside air damper 250, close return air damper 260, and open exhaust air damper 270 to configure A/C unit 110 in economizer mode. Although shown in FIG. 2 as associated with a single A/C unit 110, in other implementations, HVAC controller 210 may control operations of multiple HVAC units 110.

Outside temperature sensor 220 may include one or more temperature monitoring device to identify an outside ambient air temperature and provide the outside ambient air temperature to HVAC controller 210. Outside temperature sensor 220 may include, for example, a thermometer, a thermocouple, a thermostat, or a thermistor. In one implementation, outside temperature sensor 220 may provide real-time (e.g., synchronous with an event occurrence) or near-real time temperature readings to HVAC controller 210. In another implementation, outside temperature sensor 220 may provide temperature readings at particular intervals and/or when requested by HVAC controller 210.

Indoor temperature sensor 230 may include one or more temperature managing and/or monitoring device. Indoor temperature sensor 230 may receive indoor temperature settings, may identify an indoor ambient air temperature (e.g., inside facility 140), and/or may provide the indoor ambient air temperature to HVAC controller 210. Indoor temperature sensor 230 may include devices similar to any of those described above for outside temperature sensor 230.

ICTE load sensors 240 may include one or more monitoring devices to obtain operating load levels for equipment within facility 140. For example, ICTE load sensor 240 may collect current readings from power source 130 output and/or power source 130 input (e.g., to capture the power conversion losses). ICTE load sensors 240 may include a variety of interfaces (e.g., networked or discrete contacts) to the power source 130 or current transformer (not shown) on the line or load side of power source 130. In other implementations, other mechanisms for determining operating load levels of ICTE 120 and/or power supply 130 may be used. For example, ICTE load sensors 240 may use data throughput measurements for ICTE 120, thermal sensors, or other power consumption sensors to determine operating load levels of ICTE 120 and/or power supply 130. In one implementation, ICTE load sensor 240 may provide real-time (or near-real time) load levels to HVAC controller 210. In another implementation, ICTE load sensor 240 may provide load levels at particular intervals and/or when requested by HVAC controller 210.

Although FIG. 2 shows exemplary components of control network 200, in other implementations, control network 200 may include fewer components, different components, differently arranged components, or additional components than depicted in FIG. 2.

Figure 3:
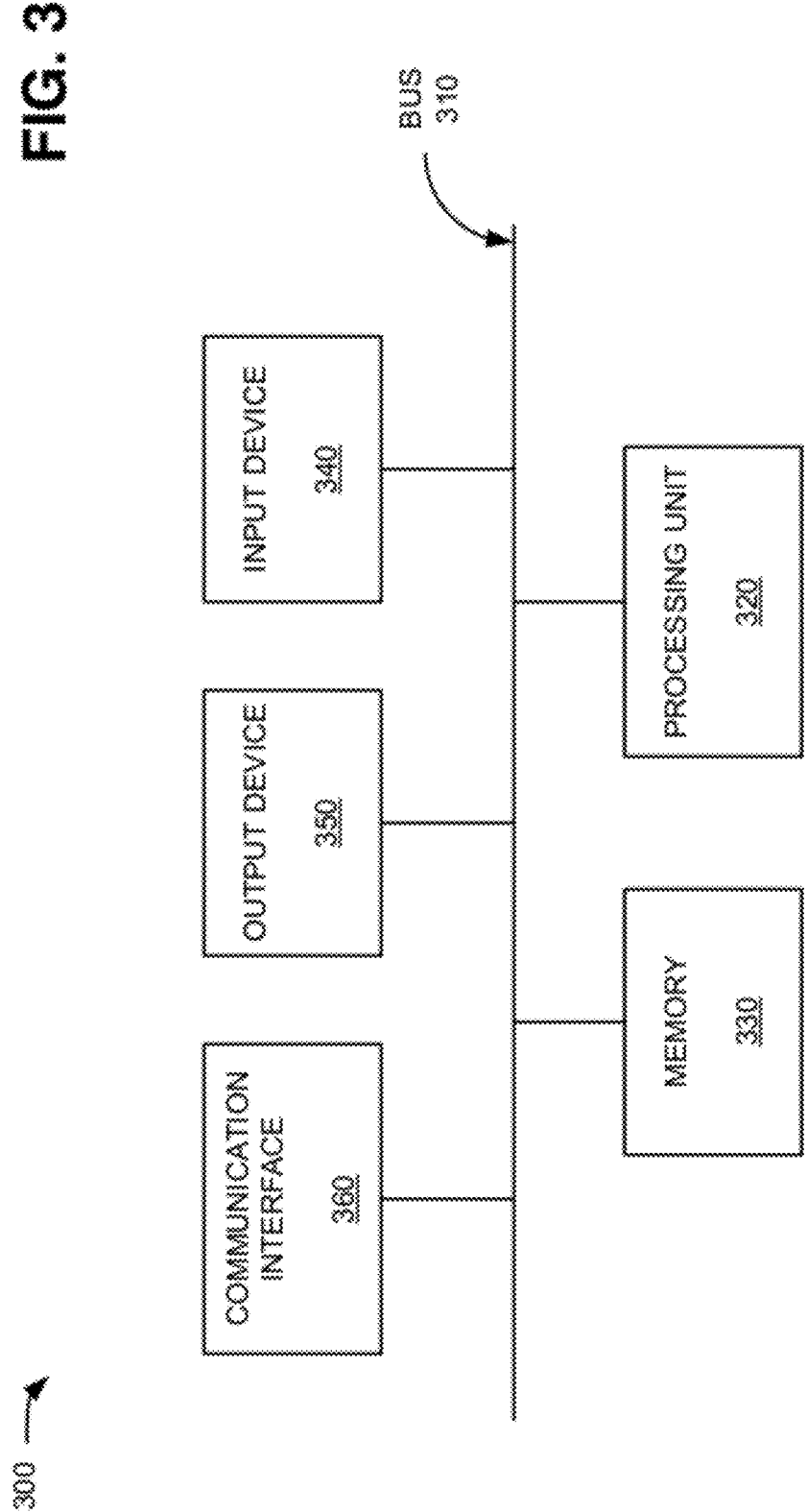
FIG. 3 is a diagram of exemplary components of an HVAC controller of FIG. 2.

FIG. 3 is a diagram of exemplary components of a device 300 that may correspond to HVAC controller 210. In other implementations, device 300 may also correspond to one or more of outside temperature sensors 220, indoor temperature sensors 230, and/or ICTE load sensors 240. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include a transceiver (e.g., a transmitter and/or receiver) that enables device 300 to communicate with other devices and/or systems. For example, communication interface 360 may include mechanisms for communicating with other devices, such as other devices of network 100 or another device 300.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than depicted in FIG. 3. As an example, in some implementations, input device 340 and/or output device 350 may not be implemented by device 300. In these situations, device 300 may be a "headless" device that does not explicitly include an input or an output device. Alternatively, or additionally, one or more components of device 300 may perform one or more other tasks described as being performed by one or more other components of device 300.

Figure 4:
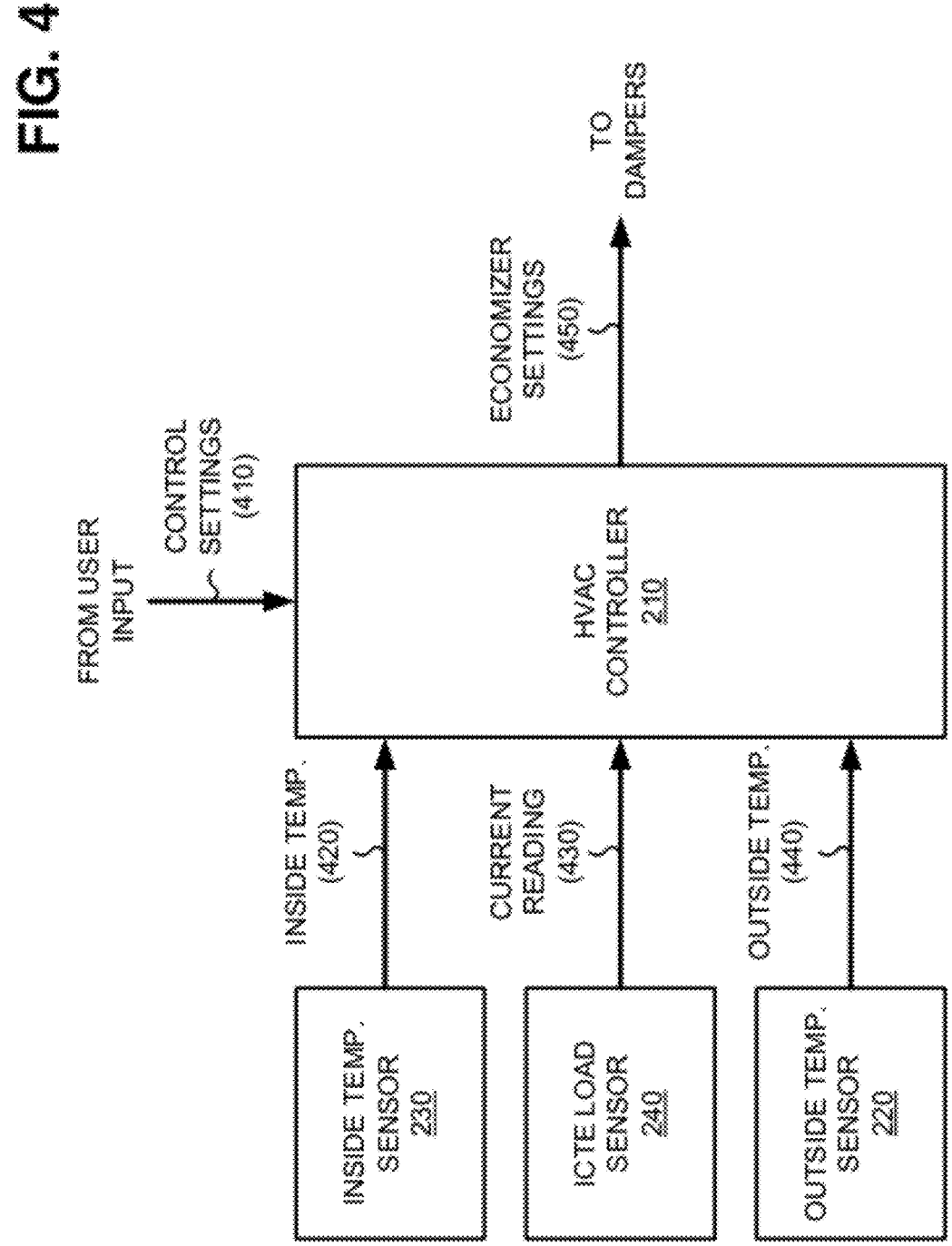
FIG. 4 is a diagram of exemplary interactions between components of a portion of the HVAC system in FIG. 2.

FIG. 4 depicts a diagram of exemplary interactions among components of a portion 400 of control network 200. As illustrated, network portion 400 may include HVAC controller 210, temperature sensors 220, indoor temperature sensors 230, and/or ICTE load sensors 240. HVAC controller 210, temperature sensors 220, indoor temperature sensors 230, and ICTE load sensors 240 may include the features described above in connection with one or more of FIGS. 2 and 3.

As shown in FIG. 4, HVAC controller 210 may receive control settings 410. Control settings 410 may be provided, for example, by a user (e.g., a building engineer, service technician, etc.), provided from a physical memory device, and/or received via a network connection. HVAC controller 210 may receive control settings 410 and may store (e.g., in memory 330) control settings 410. Control settings 410 may include, for example, a ventilation rate ($V_{cfm}$) and a sensible cooling load (Qs) index.

The ventilation rate may be a fixed value on constant volume systems (e.g., A/C unit 110). The ventilation rate may be supplied from a manufacturer's cataloged information for a particular A/C unit 110 and/or may be field measured using industry acceptable practices. In one implementation, where redundant HVAC units 110 are provided, the combined ventilation rates for each A/C unit 110 (e.g., total system cfm) can be used so that further reductions in the required temperature difference between indoor and outside can be used.

The sensible cooling load index may provide a cross-reference between measured operating load values of ICTE 120 and/or power supply 130 and required cooling capacities. In one implementation, the sensible cooling load index may include DC current load values (e.g., for ICTE 120, in amps) corresponding to economizer cooling capacities (e.g., in Btu/hr) required to achieve a particular internal temperature. The sensible cooling load index may be calculated based on, for example, empirical data and/or specifications for ICTE 120 and power supply 130.

Inside temperature sensor 230 may measure air temperatures inside facility 140 and may provide inside temperature readings 420 to HVAC controller 210. Inside temperature reading 420 may be a set value (e.g., a thermostat setting) or an actual value provided in real time, in near-real time, at particular intervals, or in response to a request (not shown) from HVAC controller 210.

ICTE load sensor 240 may take electrical current readings (or other operating load data) from power source 130 output and/or power source 130 input and may provide current readings 430 to HVAC controller 210. Current reading 430 may be provided in real time, in near-real time, at particular intervals, or in response to a request (not shown) from HVAC controller 210.

Outside temperature sensor 220 may measure air temperatures outside facility 140 and may provide outside temperature readings 440 to HVAC controller 210. Outside temperature reading 440 may be provided in real time, in near-real time, at particular intervals, or in response to a request (not shown) from HVAC controller 210.

HVAC controller 210 may receive inside temperature reading 420, current reading 430, and outside temperature reading 440. HVAC controller 210 may use control settings 410 to determine a corresponding sensible heat flow (Qs) value for current reading 430. For example, HVAC controller 210 may determine a best sensible heat flow (Qs) match for current reading 430 using the sensible cooling load index from control settings 410. HVAC controller 210 may apply inside temperature reading 420, the corresponding sensible cooling load (Qs), and the ventilation rate ($V_{cfm}$) from control settings 410 to determine the start temperature threshold (e.g., a highest possible outside air temperature) at which the economizer mode may be invoked for A/C unit 110 given the current cooling load.

For example, the required ventilation rate ($V_{cfm}$) necessary by an airside economizer can be determined by the following equation:

$$V_{cfm} = \frac{Qs, \frac{Btu}{hr}}{\left(1.08 \, Btu - \frac{min}{ft\,3} - hr - °\,F.\right)(Tid, °\,F. - Tin, °\,F.)} \quad (1)$$

where Qs is the sensible cooling load, Tid is the outside air temperature, and Tin is the inside are temperature. See Equation 39.6(b) page 39-4, Mechanical Engineering Reference Manual, 11$^{th}$ Edition; Lindeburg, M, P. E. 2001. In one implementation, A/C unit 110 may solve this equation for Tid, where Tid may represent the economizer start temperature threshold. In another implementation, A/C unit 110 may include data structure (or table) that incrementally charts the economizer start temperature threshold for fixed conditions, as described further in connection with FIG. 6.

HVAC controller 210 may compare outside temperature reading 440 to the determined start temperature threshold. If outside temperature reading 440 is at or below the start temperature threshold, HVAC controller 210 may provide economizer settings 450 to the economizer components (e.g., outside air damper 250, close return air damper 260, and open exhaust air damper 270) activate the economizer. Alternatively, HVAC controller 210 may continue to monitor inside temperature reading 420, current reading 430, and outside temperature reading 440 until outside temperature reading 440 reaches the start temperature threshold.

Although FIG. 4 shows exemplary components of control network portion 400, in other implementations, control network portion 400 may include fewer components, different components, differently arranged components, and/or additional components than depicted in FIG. 4. Alternatively, or additionally, one or more components of control network portion 400 may perform one or more other tasks described as being performed by one or more other components of control network portion 400.

FIG. 5 depicts a portion of a data structure 500 that is capable of being generated/used by HVAC controller 210. Data structure 500 may include values for A/C unit 110 when configured as a typical 5-ton wall-pack unit. As shown in FIG. 5, data structure 500 may include a DC load field 510, a Qs field 520, a $V_{cfm}$ field 530, a Tin field 550, a Tid field 550, and a variety of entries 560 associated with fields 510-550. Each row of data structure 500 may correspond to separate operating conditions for ICTE 120 and/or power supply 130.

DC load field 510 may include a direct current load (e.g., in amps) for a particular voltage (e.g., 27 vdc). Entries 560 in DC load field 510 may include separate increments (e.g., 50 amp increments). A value in DC load field 510 may be matched (or approximated) to a reading (e.g., current reading 430) from ICTE load sensor 240.

Qs field 520 may include values for required economizer cooling capacity (e.g., in Btu/hr) that correspond to values in DC load field 510. Values in Qs field 520 may be imported, for example, from control settings 410 for a particular facility 140.

$V_{cfm}$ field 530 may include values for air volume displacement associated with a particular A/C unit 110 (or group of HVAC units 110). For example, as shown in FIG. 5, cubic feet per meter displacement at 0.2 external static pressure (ESP) and dry coil on a typical 5-ton HVAC unit may be 2000 cfm.

Tin field 540 may include a desired temperature inside facility 140. While a single value (e.g., "77") is shown for Tin field 540, data structure 500 may accommodate multiple values for indoor temperature setting (e.g., within an operating range of inside temperatures for facility 140).

Tid field 550 may include an economizer start temperature threshold that corresponds to the values in DC load field 510 and/or Qs field 520. Values in Tid field 550 may be calculated, for example, based on solving equation (1) above.

Data structure 500 shows economizer control settings based on internal DC loads. As seen in FIG. 5, for facilities with lower DC loads (e.g., shown in DC load field 510), much lower temperature differences (e.g., between values in Tin field 540 and Tid field 550) can be used to operate the airside economizer than would be used with a conventional approach of a fixed temperature or enthalpy setting. For example, as small as a 5 degree F. temperature difference (e.g., 77° F. indoor/72° F. outside) may be sufficient to initiate on airside economizer given displacement ($V_{cfm}$) available from a typical 5-ton HVAC unit.

Although FIG. 5 shows example information that may be provided in data structure 500, in other implementations, data structure 500 may contain less, different, differently arranged, or additional information than depicted in FIG. 5. For example, data structure 500 may take the form of a spreadsheet, a database, a flat data structure, etc.

FIG. 6 is a flowchart of an exemplary process 600 for dynamically adjusting airside economizer high start limits, according to an implementation described herein. In one implementation, process 600 may be performed by one or more components of HVAC controller 210, such as one or more processing units 220. In another implementation, one or more blocks of process 600 may be performed by one or more other devices or a group of devices including or excluding HVAC controller 210.

Process 600 may include receiving fixed control settings for an HVAC unit and/or facility (block 610). For example, as described in connection with FIG. 4, HVAC controller 210 may receive control settings 410. Control settings 410 may be provided, for example, by a user (e.g., a building engineer, service technician, etc.), provided from a physical memory device, and/or received via a network connection. HVAC controller 210 may receive control settings 410 and may store (e.g., in memory 330) control settings 410. Control settings 410 may include, for example, a ventilation rate ($V_{cfm}$) and a sensible cooling load (Qs) index. In another implementation, control settings 410 may include a pre-configured data structure, such as data structure 500.

Process 600 may further include detecting that an economizer for the HVAC unit is in an off state (block 620). For example, HVAC controller 210 may detect damper settings (e.g., of outside air damper 250, return air damper 260, and exhaust air damper 270) to determine if A/C unit 110 is in a state to potentially transition from mechanical cooling to an active economizer mode (e.g., due to decreasing outside air temperatures).

Process 600 may also include receiving an inside temperature setting (Tin) (block 630), receiving an electrical current reading for ICTE and/or a power supply in the facility (block 640), and converting the electrical current reading to a sensible cooling load (Qs) (block 650). For example, as described in connection with FIG. 4, inside temperature sensor 230 may measure air temperatures inside facility 140 and may provide inside temperature readings 420 to HVAC controller 210. ICTE load sensor 240 may take electrical current readings from power source 130 output and/or power source 130 input and may provide current readings 430 to HVAC controller 210. HVAC controller 210 may receive inside temperature reading 420 and current reading 430, and may use control settings 410 to determine a corresponding sensible heat flow (Qs) value for current reading 430. For example, HVAC controller 210 may determine a best sensible heat flow (Qs) match for current reading 430 using the sensible cooling load index from control settings 410.

Referring still to FIG. 6, process 600 may include determining, based on Tin and Qs, an outside temperature threshold (Tid) for starting the economizer (block 660). For example, as described above in connection with FIG. 4, HVAC controller 210 may apply inside temperature reading 420, the corresponding sensible cooling load (Qs), and the ventilation rate ($V_{cfm}$) from control settings 410 to determine the start temperature threshold (e.g., a highest possible outside air temperature) at which the economizer mode may be invoked for A/C unit 110 given the current cooling load.

Process 600 may include receiving an outside air temperature reading (block 670), and determining if the outside air temperature is less than or equal to Tid (block 680). If the outside air temperature is greater than Tid (block 680—NO), process 620 may return to process block 630. If the outside air temperature is less than or equal to Tid (block 680—YES), the economizer for the HVAC unit may be activated (block 690). For example, as described above in connection with FIG. 4, HVAC controller 210 may receive outside temperature reading 440 from outside temperature sensor 220. HVAC controller 210 may compare outside temperature reading 440 to the determined start temperature threshold. If outside temperature reading 440 is at or below the start temperature threshold, HVAC controller 210 may provide economizer settings 450 to the economizer components (e.g., outside air damper 250, close return air damper 260, and open exhaust air damper 270) activate the economizer. Alternatively, HVAC controller 210 may continue to monitor inside temperature reading 420, current reading 430, and outside temperature reading 440 until outside temperature reading 440 reaches the start temperature threshold.

Systems and/or methods described herein may store control settings for an air conditioning unit for a facility or space that houses ICTE. The air conditioning unit may include an economizer configured to supply outside cooling air when the economizer is in an active state. The systems and/or methods may receive an inside temperature value associated with the facility/space, and may receive a real-time or near-real-time operating load value for the ICTE. The systems and/or methods may determine, based on the inside temperature value, the operating load value, and the control settings, an outside temperature threshold for starting the economizer. The systems and/or methods may determine if an outside temperature reading associated with the space is below the outside temperature threshold, and may activate the economizer when the outside air temperature reading is below the outside temperature threshold.

Implementations described herein may be applicable to transitions from mechanical cooling to an economizer mode for an A/C unit (e.g., as outside temperatures drop from high to low). Transitions from an economizer mode to mechanical cooling (e.g., as outside temperatures rise from low to high) may use different control techniques, such as known high limit shut-off controls.

They systems and/or methods may provide improvement over traditional airside economizer control functions. The systems and/or methods may increase the total number of economizer hours of operation by permitting the operation of economizers at a higher outside ambient temperature than traditional methods. The systems and/or methods may utilize redundant cooling equipment during portions of the economizer operation which could otherwise stay dormant waiting for failure of another unit. Furthermore, the systems and/or methods may provide a capability to reset the outside temperature at which economizer capability is enabled by dynamically adjusting the temperature difference between the internal setpoint and the outside ambient temperature condition.

The foregoing description provides illustration and description, but is not intended to be exhaustive or to limit the invention to the precise form disclosed. Modifications and variations are possible in light of the above teachings or may be acquired from practice of the invention. For example, while a series of blocks has been described with respect to FIG. 6, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   receiving, by a control device, control settings for an air conditioning unit for a space that houses information and communication technology equipment (ICTE), the air conditioning unit including an economizer configured to supply outside cooling air when in an active state;
   receiving, by the control device, an inside temperature value associated with the space;
   receiving, by the control device, an electrical current reading associated with one or more of the ICTE and a power supply for the ICTE;
   converting, by the control device and based on the control settings, the electrical current reading to a sensible cooling load value; and
   determining, by the control device, an outside temperature threshold for starting the economizer, wherein the outside temperature threshold is based on the inside temperature value and the sensible cooling load value.

2. The method of claim 1, further comprising:
   receiving an outside temperature reading associated with the space;
   determining if the outside air temperature reading is below the outside temperature threshold; and
   activating the economizer when the outside air temperature reading is below the outside temperature threshold.

3. The method of claim 2, further comprising:
   detecting, prior to the activating, that the economizer is in an inactive state.

4. The method of claim 1, wherein the ICTE and the power supply provide a majority of a total sensible cooling load of the space.

5. The method of claim 1, further comprising:
   receiving an updated inside temperature value;
   receiving an updated electrical current reading associated with one or more of the ICTE and the power supply for the ICTE; and
   determining a new outside temperature threshold based on one or more of the inside temperature value or the electrical current reading.

6. The method of claim 1, wherein the electrical current reading is a real-time or near-real-time value.

7. The method of claim 1, further comprising:
storing, in a memory, the control settings.

8. The method of claim 1, wherein the control settings include:
a maximum ventilation rate for the air conditioning unit, and
a sensible cooling load index to identify required cooling capacities for the space for a plurality of electrical current values associated with the one or more of the ICTE and the power supply for the ICTE.

9. A device, comprising:
a memory to store a plurality of instructions; and
a processor configured to execute instructions in the memory to:
store control settings for an air conditioning unit for a space that houses power-consuming equipment, the air conditioning unit including an economizer configured to supply outside cooling air when in an active state;
receive an inside temperature value associated with the space;
receive a real-time or near-real-time operating load value for the power-consuming equipment; and
determine an outside temperature threshold for starting the economizer based on the inside temperature value, the operating load value, and the control settings.

10. The device of claim 9, wherein the operating load value includes:
an electrical current reading associated with one or more of the power-consuming equipment and a power supply for the power-consuming equipment.

11. The device of claim 9, wherein, when determining, an outside temperature threshold for starting the economizer, the processor is further configured to:
convert the operating load value to a sensible cooling load value for the space, and
calculate the outside temperature threshold based on the inside temperature value, the sensible cooling load value, and a maximum ventilation rate of the air conditioning unit.

12. The device of claim 9, wherein the real-time or near-real-time operating load value for the power-consuming equipment is less than the full operating load value for the power-consuming equipment.

13. The device of claim 9, wherein the processor is further configured to:
receive an outside temperature reading associated with the space;
determine if the outside air temperature reading is below the outside temperature threshold; and
activate the economizer when the outside air temperature reading is below the outside temperature threshold.

14. The device of claim 13, wherein the processor is further configured to:
detect, prior to the activating, that the economizer is in an inactive state.

15. The device of claim 9, wherein the processor is further configured to:
receive an updated operating load value for the power-consuming equipment; and
determine a new outside temperature threshold based on the updated operating load value.

16. The device of claim 9, wherein the power-consuming equipment and the power supply provide at least seventy-five percent of a total sensible cooling load of the space.

17. A computer-readable medium including instructions to be executed by a processor, the instructions including one or more instructions, when executed by the processor, for causing the processor to:
store a maximum ventilation rate for an air conditioning unit associated with a space that houses information and communication technology equipment (ICTE);
store a sensible cooling load index to identify required cooling capacities for the space for a plurality of operating loads associated with the ICTE;
receive an inside temperature value associated with the space;
receive a real-time or near-real-time operating load value for the ICTE; and
determine, based on the inside temperature value, the operating load value, and the sensible cooling load index, an outside temperature threshold for starting an economizer that supplies outside cooling air to the air conditioning unit.

18. The computer-readable medium of claim 17, where the one or more instructions to determine the outside temperature threshold for starting the economizer further includes:
one or more instructions to convert, based on the sensible cooling load index, the operating load value to a corresponding sensible cooling load value for the space.

19. The network of claim 17, further including one or more instructions for causing the processor to:
receive an outside temperature reading associated with the space;
determine if the outside air temperature reading is below the outside temperature threshold; and
send a signal to activate the economizer when the outside air temperature reading is below the outside temperature threshold.

20. The network of claim 17, wherein the operating load value includes:
an electrical current reading associated with output or input of the ICTE.

* * * * *